US012152423B2

(12) United States Patent
Friedli et al.

(10) Patent No.: US 12,152,423 B2
(45) Date of Patent: Nov. 26, 2024

(54) SLIDING DOOR

(71) Applicant: Inventio AG, Hergiswil (CH)

(72) Inventors: Paul Friedli, Remetschwil (CH); Jonas Vonaesch, Lucerne (CH)

(73) Assignee: INVENTIO AG, Hergiswil (CH)

( * ) Notice: Subject to any disclaimer, the term of this patent is extended or adjusted under 35 U.S.C. 154(b) by 514 days.

(21) Appl. No.: 17/310,478

(22) PCT Filed: Mar. 2, 2020

(86) PCT No.: PCT/EP2020/055411
§ 371 (c)(1),
(2) Date: Aug. 5, 2021

(87) PCT Pub. No.: WO2020/182513
PCT Pub. Date: Sep. 17, 2020

(65) Prior Publication Data

US 2022/0106823 A1 Apr. 7, 2022

(30) Foreign Application Priority Data

Mar. 8, 2019 (EP) .................................... 19161711

(51) Int. Cl.
*E05D 15/56* (2006.01)
*E05D 15/06* (2006.01)
(Continued)

(52) U.S. Cl.
CPC ......... *E05D 15/56* (2013.01); *E05D 15/0604* (2013.01); *E05D 15/063* (2013.01);
(Continued)

(58) Field of Classification Search
CPC ... E05D 15/58; E05D 2015/586; E05D 15/10; E05D 15/646; E05D 15/56;
(Continued)

(56) References Cited

U.S. PATENT DOCUMENTS 10,136,740 B2 * 11/2018 Goppion ................. A47F 3/002
2006/0032140 A1 * 2/2006 Arimoto ............... E05F 15/646 49/413
(Continued)

FOREIGN PATENT DOCUMENTS

AT 507815 A1 8/2010
DE 10163061 A1 * 6/2003 ......... E05D 15/1005
(Continued)

*Primary Examiner* — Johnnie A. Shablack
*Assistant Examiner* — Matthew R. Shepherd
(74) *Attorney, Agent, or Firm* — Williams J. Clemens; Shumaker, Loop & Kendrick, LLP

(57) ABSTRACT

A sliding door horizontally displaceable between two building wall elements includes a door leaf support frame with an attached door leaf, whereby a distance, perpendicular to a displacement direction of the support frame, between the door leaf and the support frame is changeable between an open position of the door leaf between the wall elements and a closed position of the door leaf in a door opening of one of the wall elements with outer surfaces of the door leaf and wall in alignment. A control element is movable in the displacement direction relative to the support frame and cooperates with a closing edge of the opening to increase and decrease the distance between the door leaf and the door leaf support frame during the closing and opening respectively in a region adjacent the closing edge.

17 Claims, 7 Drawing Sheets

(51) Int. Cl.

| | |
|---|---|
| ***E05D 15/10*** | (2006.01) |
| ***E05F 15/646*** | (2015.01) |
| ***E06B 3/46*** | (2006.01) |

(52) U.S. Cl.
CPC ........ *E05D 15/1042* (2013.01); *E05F 15/646* (2015.01); *E06B 3/4654* (2013.01); *E05Y 2201/626* (2013.01); *E05Y 2800/122* (2013.01); *E05Y 2900/14* (2013.01)

(58) Field of Classification Search
CPC .............. E05D 15/0604; E05D 15/063; E05D 15/1042; E05F 15/0604; E05F 15/1402; E06B 2/4654; E06B 3/4654
USPC ............................................................ 49/163
See application file for complete search history.

(56) References Cited

U.S. PATENT DOCUMENTS

| | | | | |
|---|---|---|---|---|
| 2014/0352220 | A1* | 12/2014 | Rees | E06B 3/509 49/164 |
| 2022/0106823 | A1* | 4/2022 | Friedli | E05D 15/0604 |

FOREIGN PATENT DOCUMENTS

| | | | | | |
|---|---|---|---|---|---|
| DE | 10163061 | B4 | | 2/2007 | |
| EP | 1731703 | A2 | | 12/2006 | |
| EP | 2025854 | A2 | * | 2/2009 | E06B 3/4645 |
| EP | 2871316 | A1 | | 5/2015 | |
| EP | 2876241 | A1 | | 5/2015 | |
| ES | 2662701 | A1 | * | 4/2018 | E06B 3/4654 |
| WO | WO-2009139016 | A2 | * | 11/2009 | E06B 3/4645 |
| WO | 2018065653 | A1 | | 4/2018 | |
| WO | WO-2022078840 | A1 | * | 4/2022 | E05B 63/22 |

* cited by examiner

Section A-A

Section B-B

Section C - C

SLIDING DOOR

FIELD

The invention relates to a sliding door which is installed between two preferably planar wall elements of a building wall and has at least one door leaf which is mounted on a door leaf support frame that is displaceable in the closing and opening direction, which has approximately the dimensions of a door opening in the associated wall element, and which is thus displaceable transversely to the outer surfaces of the wall elements such that, in the closed state of the sliding door, the outer surface of the door leaf is aligned with the outer surface of the associated wall element.

BACKGROUND

Such sliding doors are usually provided with two door leaves mounted on the same door leaf support frame, with the outer surface of the second door leaf also being aligned with the outer surface of the wall element assigned thereto in the closed state of the sliding door. Such sliding doors and in particular also the door openings are almost invisible in the closed state, which is advantageous both in terms of aesthetics and in terms of security.

DE 101 63 061 B4 discloses a sliding door which comprises a door leaf support which can be displaced in the horizontal direction between two wall shells and on which two door leaves which can be spread in opposite directions are mounted. When the sliding door is in the closed state, the outer surfaces of the spread door leaves are flush with the outer surfaces of the two wall shells. The door leaf support is horizontally displaceable on a linear guide and displaceable by means of a traction means drive driven by an electric motor. The door leaves are connected in the upper region thereof to the sliding door leaf support via handlebar levers forming a parallelogram guide system in each case, so that a distance, measured at a right angle to the outer surfaces of the wall elements, between the door leaf and the door leaf support frame can be changed such that the outer surface of the door leaf can be positioned, in the open state of the sliding door, between the two wall elements and, in the closed state, in the door opening and in alignment with the outer surface of the wall element assigned to the door leaf.

In this sliding door, the spreading of the door leaves—i.e. the increase in the distance between a door leaf and the door leaf support—takes place in that shortly before the end of a closing movement, door leaf components hit a stop plane that is stationary transversely to the displacement direction of the door leaf support, the reaction forces occurring interacting with the handlebar levers of the door leaves, which are inclined with respect to the stop plane, in such a way that the door leaf components slide sideways on the stop plane and pivot the door leaves outward until the end of the closing movement is reached. Such a generation of the spreading movement of the door leaves has the disadvantage that the spreading mechanism is visible and inevitably associated with impact noises, vibrations, scratching noises and surface damage in the region of the sliding paths of the elements sliding on one another. In addition, no functioning solution for generating correct door leaf movements when opening the sliding door can be identified.

SUMMARY

An object of the invention is to create a sliding door which does not have the disadvantages mentioned above.

The object is achieved by a sliding door of the type described above, in which a control element is arranged in or on the door leaf support frame which can be displaced in the displacement direction of the door leaf support frame and which can be blocked at the beginning of an end region of a closing movement of the door leaf support frame by a stationary stop and can be displaced relative to the still-moving door leaf support frame, a transmission mechanism being provided which converts a first relative movement occurring between the control element and the door leaf support frame into a defined pivoting movement of the handlebar levers forming a parallelogram guide system and thus into an increase in the distance between the door leaf and the door leaf support frame.

The advantages of the solution according to the invention can be seen particularly clearly in the fact that in order to generate a pivoting movement of the handlebar levers forming a parallelogram guide system, unlike in the cited prior art, handlebar levers that are simply inclined do not come into contact with a stop plane that is stationary transversely to the displacement direction of the door leaf support frame. A transmission mechanism which is practically invisible from the outside is used, by means of which a first relative movement, caused in the end region of the closing movement of the door leaf support frame, between a control element and the door leaf support frame is converted via mechanically optimized transmission elements into the desired pivoting movements of the handlebar levers and thus into a door leaf movement directed transversely to the outer surfaces of the wall elements with minimal noise and vibrations.

The term "end region of the closing movement" is to be understood as the last part of the closing movement of the door leaf support frame, which begins approximately 10 to 20 millimeters before the final position of the door leaf support frame in the closed state of the sliding door and ends in this final position.

In one of the possible embodiments of the sliding door, in each case two handlebar levers forming a parallelogram guide system are fixed at one end to one of two vertically arranged and horizontally spaced torsion bars, which torsion bars are rotatably mounted on the door leaf support frame, all handlebar levers being approximately the same length and aligned parallel to one another and having vertical-axis door leaf bearing points at the other ends thereof, which bearing points interact with corresponding bearing points on the door leaf in such a way that the door leaf is guided on a parallelogram guide system in which a pivoting movement of one of the two torsion bars causes the increase or decrease in the above-mentioned distance between the door leaf and the door leaf support frame.

This embodiment has the advantage that the at least one door leaf is not only connected to the door leaf support frame in its upper region via handlebar levers. As a result, stable positions of the door leaf are achieved in all operating states, which is not guaranteed by the guide system of the sliding door according to the cited prior art. It is also advantageous that guide grooves for the door leaf in the bottom region of the sliding door can be avoided.

In another possible embodiment of the sliding door, the transmission mechanism has a control groove arranged in the control element, a drive lever attached to one of the two torsion bars and a slide bolt fixed to the end of the drive lever facing away from the torsion bar, parallel to the torsion bar, which slide bolt engages in the control groove, the control groove being shaped in such a way that due to the first relative movement occurring at the beginning of the end region of the closing movement between the control element with the control groove on the one hand and the torsion bar mounted on the door leaf support frame with the drive lever and the slide bolt on the other hand, the slide bolt is moved in the control groove, resulting in the above-mentioned defined pivoting movement of the torsion bar and thus the handlebar levers forming a parallelogram guide system.

This embodiment has the advantage that the relative movement between the door leaf support frame with the drive lever connected to the door leaf support frame via the torsion bar and provided with the slide bolt, on the one hand, and the control element with the control groove, which is stationary in the end region of the closing movement of the door leaf support frame, on the other hand, is converted into a pivoting movement of one of the two torsion bars of a door leaf which is precisely and freely definable due to the shape of the control groove. By means of a parallelogram effect, the defined pivoting movement of this torsion bar is transmitted via its handlebar levers to the door leaf, from this to the handlebar levers of the other torsion bar and from these to the other torsion bar, which also ensures the precise intended movement of the door leaf.

In another possible embodiment of the sliding door, the control groove arranged in the control element is shaped in such a way that, in the end region of the closing movement of the door leaf support frame, a movement of the door leaf directed at a right angle to the outer surfaces of the wall elements results from a superimposition of the movements of the torsion bars moving with the door leaf support frame and the door-leaf-side door leaf bearing points of the handlebar levers pivoting around the torsion bars.

This ensures that, in the end region of the closing movement of the door leaf support frame, the door leaves can enter the door opening in the associated wall element exactly at a right angle to the closing movement and with little backlash and remain positioned there until a later door opening.

In another possible embodiment of the sliding door, a retaining device is arranged between the control element, which can be displaced in or on the door leaf support frame, and the stationary stop, which retaining device, at the end of the closing movement of the door leaf support frame, holds the control element slidably arranged therein in a fixed position with a limited force, so that in the initial region of an opening movement of the door leaf support frame the control element performs a second relative movement, counter to the first relative movement, between the control element and the door leaf support frame which, by means of the above-mentioned transmission mechanism, resets the increase or decrease in the above-mentioned distance between the door leaf and the door leaf support frame.

Such an embodiment resets the first relative movement between the door leaf support frame and the control element arranged displaceably therein and thus reduces the distance between the door leaf and the door leaf support frame, so that the sliding door can be opened completely, in which case both the door leaf support frame and the at least one door leaf arranged thereon can also be positioned between the wall elements. This embodiment has the advantage that the above-mentioned return does not have to be generated by means of a spring. When using a spring return, the displacement drive would have to maintain the closed state permanently with a closing force, which in practice could only be achieved by means of a motor brake. However, this would make it impossible to open the sliding door in the event of a malfunction or power failure.

In another possible embodiment of the sliding door, the retaining device can comprise a permanent holding magnet which is attached to the control element in such a way that, at the beginning of the end region of the closing movement of the door leaf support frame, the holding magnet strikes a stationary stop made of soft magnetic material, as a result of which the control element is displaced relative to the door leaf support frame and the control element is held on the stop with a limited holding force.

In this embodiment, a simple and inexpensive permanent holding magnet causes the above-described reset of the first relative movement between the door leaf support frame and the control element arranged displaceably therein and thus reduces the distance between the door leaf and the door leaf support frame during opening. As soon as the first relative movement in the end region of the closing movement of the door leaf support frame between the control element and thus the increase in the distance between the door leaf and the door leaf support frame at the end of the initial region of the door opening movement have been reversed, the permanent holding magnet is separated from the stationary stop.

In another possible embodiment of the sliding door, the retaining device can comprise a spring-loaded snap device which interacts with at least one retaining surface, inclined with respect to the direction of the opening movement, on the control element such that the control element, when it strikes the stationary stop at the beginning of the end region of the closing movement of the door leaf support frame, is retained on the stationary stop with a limited holding force.

With such a snap device as a retaining device, the retaining force can be adjusted more easily and kept constant over a long period of time.

In another possible embodiment of the sliding door, the electric motor serving to displace the door leaf support frame is arranged on the sliding door leaf support frame. This drive arrangement has the advantage that neither a drive support nor a cable connection box needs to be installed outside the door leaf support frame, so that only a small amount of installation work is required at the installation site of the sliding door.

In another possible embodiment of the sliding door, this is equipped with a second door leaf which is arranged symmetrically to the at least one door leaf with respect to the door leaf support frame and is attached to the door leaf support frame with the same components as the at least one door leaf and is movable transversely to the outer surfaces of the wall elements. With such a sliding door, passages through building walls can be created in which door openings in both wall elements can be closed with door leaves, the outer surfaces of which, when the sliding door is closed, are aligned with the respectively assigned outer surfaces of the wall elements.

In another possible embodiment of the sliding door, the at least one door leaf is equipped with a latch which, in the closed state of the sliding door, resets the increase or decrease in the distance, measured at a right angle to the outer surfaces of the wall elements, between the door leaf and the door leaf support frame and thus prevents an opening movement of the door leaf support frame.

In this way, latching of the sliding door, which cannot be opened from a desired side of the building wall, can be implemented with simple means.

In another possible embodiment of the sliding door, the latch comprises a rotary stop which is arranged on the torsion bar driven by the control groove of the control element and mounted on the door leaf support frame, and comprises a bar hingedly mounted in or on the control element and resiliently engaging in the rotary stop, the bar interacting with the rotary stop such that, after each closing process, a turning back of the torsion bar and thus a reset of the increase in the distance, measured at a right angle to the outer surfaces of the wall elements, between the door leaf and the door leaf support frame and thus a door opening process is prevented until either the traction means drive or a conscious manual application of force brings the bar out of engagement with the rotary stop in normal operation.

A latch according to this embodiment is inexpensive and can be implemented so as to be invisible from the outside.

In another possible embodiment of the sliding door, the conscious manual force with which a bolt assigned to one of the door leaves can be brought out of engagement with the rotary stop can be generated by manually pressing against an outer surface of a second door leaf arranged opposite.

In such an embodiment of a sliding door, the latch can only be overcome by the electrically activated traction means drive or by pressure on one of two door leaves. The lock is neither visible nor can it be unlocked by any manipulation from either of the two sides of the building wall.

In another possible embodiment of the sliding door, on the one hand, the door leaf support frame is guided in its uppermost region on the linear guide arranged above the door opening in such a way that the upper region can only be moved parallel to the linear guide, and, on the other hand, the door leaf support frame is guided in its lower region in a short guide arranged on the side of the door opening.

Such an embodiment of the sliding door has the advantage that in the region of the door opening the floor does not have to contain guides either for the door leaf support frame or for the door leaves and is therefore completely flat and free of grooves.

In the following, an embodiment of a sliding door according to the invention is described with reference to the accompanying drawings.

DETAILED DESCRIPTION

Figure 1A:
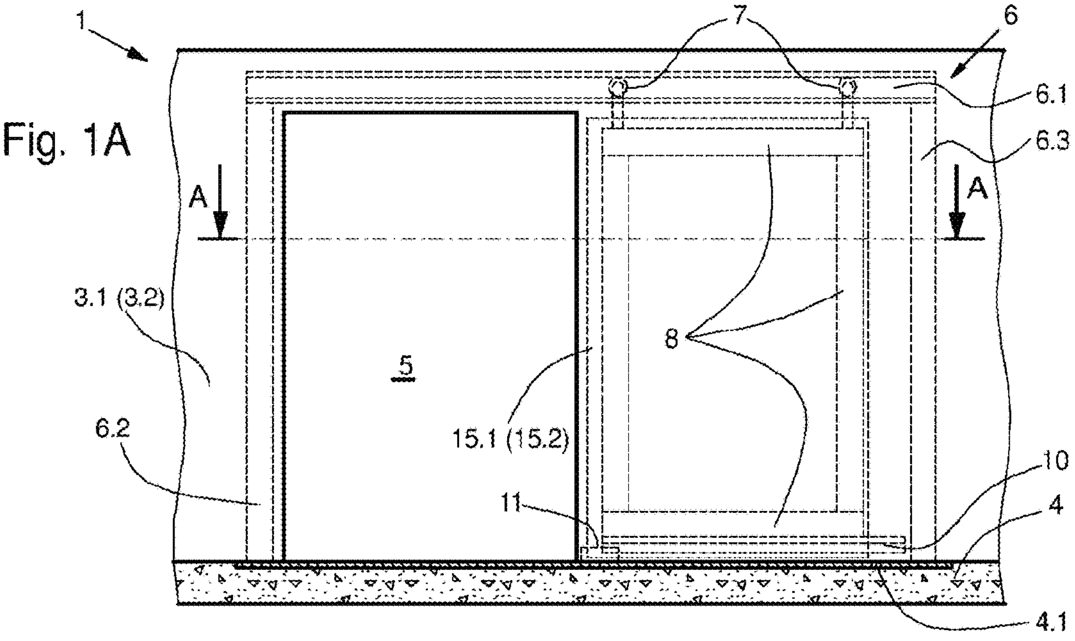
FIG. 1A is an exterior view of the sliding door installed between two wall elements provided with a door opening in the open state thereof, and FIG. 1AA a schematic horizontal section through this sliding door arrangement.
Figure 1A:
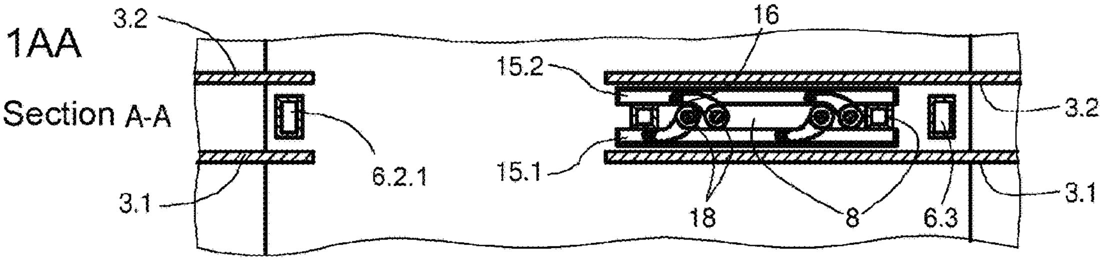

FIG. 1A shows a sliding door 1 according to the invention in a view of a front of two parallel spaced apart wall elements 3.1, 3.2 of a building wall, between which the sliding door, which is in the open state thereof, is installed. The wall elements 3.1, 3.2 are supported on a floor 4 which has an inserted base plate 4.1 in the region of the sliding door 1. A door opening 5 is present in each of the two wall elements 3.1, 3.2. A door frame 6 installed between the two wall elements 3.1, 3.2 is invisible and therefore shown in broken lines, which door frame comprises an upper linear guide 6.1 arranged above the door opening, a door frame post 6.2 containing a door closing edge 6.2.1, and a door frame post 6.3 at a distance from the door closing edge 6.2.1, the door frame posts supporting the upper linear guide 6.1. On the linear guide 6.1, which is preferably equipped with guide rollers 7, an upper part of a door leaf support frame 8 is guided displaceably in the direction of a closing or opening movement of the sliding door 1. In the lowermost region of the door leaf support frame 8, the frame is equipped with a guide rail 10 arranged in the direction of the closing or opening movement, which forms a lower linear guide with a guide shoe 11 fixed on the base plate 4.1 next to the door opening. The door leaf support frame 8, which is built to be sufficiently rigid in itself, can only be moved in the direction of the closing or opening movement due to the interaction of the two linear guides. An electromotive drive device for closing and opening the sliding door is described in connection with FIG. 2.

A door leaf 15.1, 15.2 is attached to both sides of the door leaf support frame 8 in such a way that a distance, measured at a right angle to the outer surfaces of the wall elements 3.1, 3.2, between the door leaves 15.1, 15.2 and the door leaf support frame 8 can be changed such that the door leaves can be positioned, in the open state of the sliding door 1, between the two wall elements 3.1, 3.2 and, in the closed state, in door openings 5 of the wall elements which are each assigned to one of the door leaves. In this closed state, the outer surfaces of the door leaves 15.1, 15.2 are aligned with the outer surfaces of the wall elements assigned to one of the door leaves. The horizontal section A-A through the sliding door 1 in the open state thereof shows schematically how the two door leaves 15.1, 15.2 are positioned between the two wall elements 3.1, 3.2 in the open state of the sliding door, the door leaves being mounted, via handlebar levers 16 forming a parallelogram guide system, on torsion bars 18, which are arranged vertically in the door leaf support frame 8 and pivotable about the vertical axis thereof, in such a way that the above-mentioned change in the distances between the door leaves and the door leaf support frame 8 can be carried out. The device for driving the handlebar levers 16 or for changing the distances between the door leaves 15.1, 15.2 and the door leaf support frame 8 is explained in more detail below with reference to FIGS. 2 and 3A-3C.

Figure 1B:
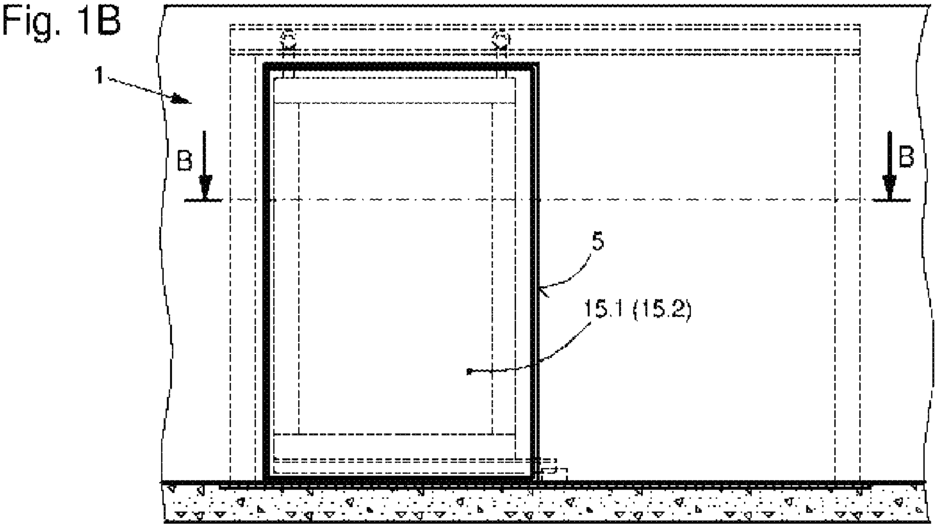
FIG. 1B is an exterior view of the installed sliding door according to FIG. 1A in the closed state thereof, and FIG. 1BB a schematic horizontal section through this sliding door arrangement.
Figure 1B:
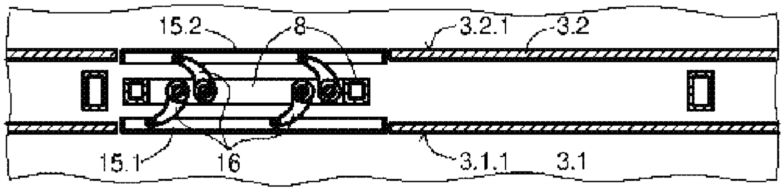

FIG. 1B and the associated horizontal section B-B show the sliding door 1, shown in its open state in FIG. 1A, in its closed state, in which the door leaf support frame 8 with the door leaves 15.1, 15.2 mounted thereon is displaced into the region of the door openings 5. In the end region of this displacement, the distances between the door leaves 15.1, 15.2 and the door leaf support frame 8 were increased by pivoting the handlebar levers 16 such that the door leaves protrude into the recesses in the wall elements 3.1, 3.2 that form the door opening 5, the outer surfaces of the door leaves 15.1, 15.2 being positioned flush with the outer surfaces 3.1.1, 3.2.1 of the respectively assigned wall elements 3.1, 3.2. In order that, in the closed state of the sliding door 1, the gaps between the door leaves 15.1, 15.2 and the recesses in the wall elements forming the door openings 5 can be as small as possible, it is necessary that the door leaves 15.1, 15.2 perform a movement at a right angle to the wall elements 3.1, 3.2 during the increase in the distances thereof from the door leaf support frame 8. How this is achieved with the sliding door according to the invention will be explained later.

Figure 2:
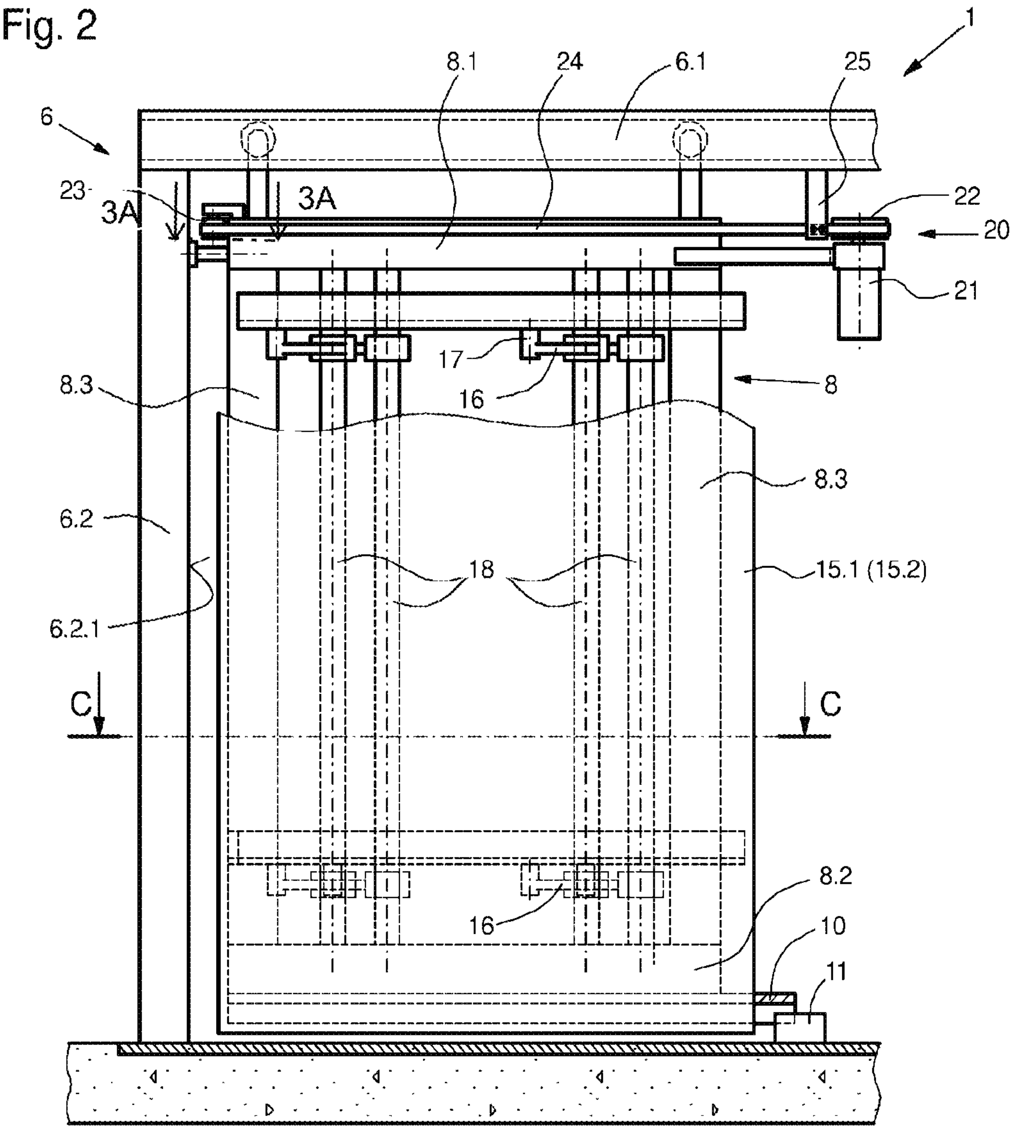
FIG. 2 shows the horizontally displaceable part of the sliding door in the closed state according to FIG. 1B, without wall elements, and FIG. 2CC a horizontal section through this displaceable part.
Figure 2C:
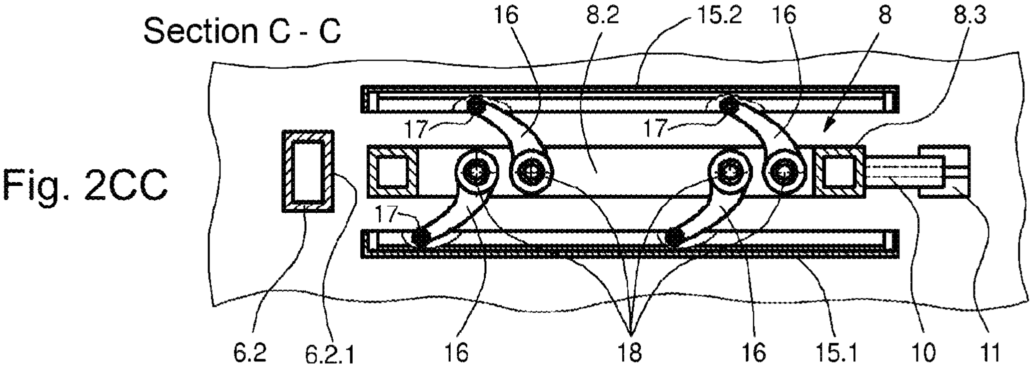

FIG. 2 shows, in an enlarged illustration, mainly the horizontally displaceable part of the sliding door 1 in the closed state thereof, the wall elements being omitted. In addition, FIG. 2 contains a horizontal section C-C through the displaceable part. The door frame, which comprises an upper horizontal linear guide 6.1 and two vertical door frame posts 6.2, 6.3 (6.3 not visible here), is in turn denoted by the reference sign 6. The above-mentioned door leaf support frame 8 is horizontally displaceably suspended and guided on the linear guide. The door leaf support frame 8 comprising an upper cross-member 8.1, a lower cross-member 8.2 and two vertical members 8.3 also has, on its lower cross-member 8.2, a guide rail 10 which is arranged parallel to the displacement direction and which cooperates with a guide shoe 11 arranged on the side of the door opening of the sliding door in the base region, in order to additionally guide and stabilize the door leaf support frame 8.

In order to generate the closing and opening movement of the door leaf support frame 8, the latter is equipped with a traction means drive 20, preferably in the form of a belt drive. The traction means drive 20 comprises an electric gear motor 21 which is fixed to the end of the upper cross-member 8.1 of the door leaf support frame 8 that is remote from the door closing edge 6.2.1, and which supports a drive pulley 22. Furthermore, the traction means drive 20 comprises two deflection pulleys 23 fixed to the end of the upper cross-member that is closer to the door closing edge 6.2.1, as well as the traction means 24, which is preferably designed as a belt and extends around the drive pulley and the two deflection pulleys. At a suitable point, the traction means 24 is fixed to a holding element 25 fixedly attached to the door frame, so that when the drive pulley 22 rotates, this results in a horizontal closing or opening movement of the door leaf support frame 8 and the door leaves 15.1, 15.2 mounted thereon.

Four torsion bars 18 extend between the upper cross-member 8.1 and the lower cross-member 8.2 of the door leaf support frame 8, which torsion bars are mounted in the cross-members so as to be pivotable about the longitudinal axes thereof. In each case, two of the four torsion bars are assigned to one of the two door leaves 15.1, 15.2, an upper and a lower handlebar lever 16 being fixed at one end to each of the torsion bars 18, and the handlebar levers having vertical-axis door leaf bearing points 17 at the other ends thereof, via which bearing points the handlebar levers 16 support and guide the door leaves 15.1, 15.2. The upper and lower handlebar levers 16 of two torsion bars in each case are coupled to an assigned door leaf 15.1, 15.2 in such a way that the door leaves are guided on a parallelogram guide system, as a result of which the door leaves always remain aligned parallel to the door leaf support frame when the distance thereof from the door leaf support frame 8 is changed.

In order to change the above-mentioned distances between the door leaves 15.1, 15.2 and the door leaf support frame 8, i.e. to generate the pivoting movements of the torsion bars 18 and thus the handlebar levers 16, there is a transmission mechanism (not visible in FIG. 2) in or on the upper cross-member 8.1 of the door leaf support frame 8, which mechanism causes the pivoting movement of one torsion bar 18 per door leaf 15.1, 15.2. Due to the effect of the parallelogram guide system, all four handlebar levers of a door leaf are pivoted synchronously. The transmission mechanism generates an increase in the above-mentioned distances when, in the end region of a door closing movement of the door leaf support frame 8, a control element, which is guided in the upper cross-member 8.1 but can be displaced relative thereto in the displacement direction of the door leaf support frame, is displaced in that a control element stop 38 (see FIG. 3A) connected to the control element moves on a stationary stop, for example the closing edge 6.2.1 of the door frame post. On the other hand, the transmission mechanism generates a decrease in the distances if, in the initial region of a door opening movement, the control element is held back or moved back with a limited holding force until the distances between the door leaves 15.1, 15.2 and the door leaf support frame are reduced such that the door leaves can be moved between the wall elements 3.1, 3.2 shown in FIG. 1A.

The above-mentioned transmission mechanism and the door leaf movements generated are described in detail with reference to FIGS. 3A-3C.

Figure 3A:
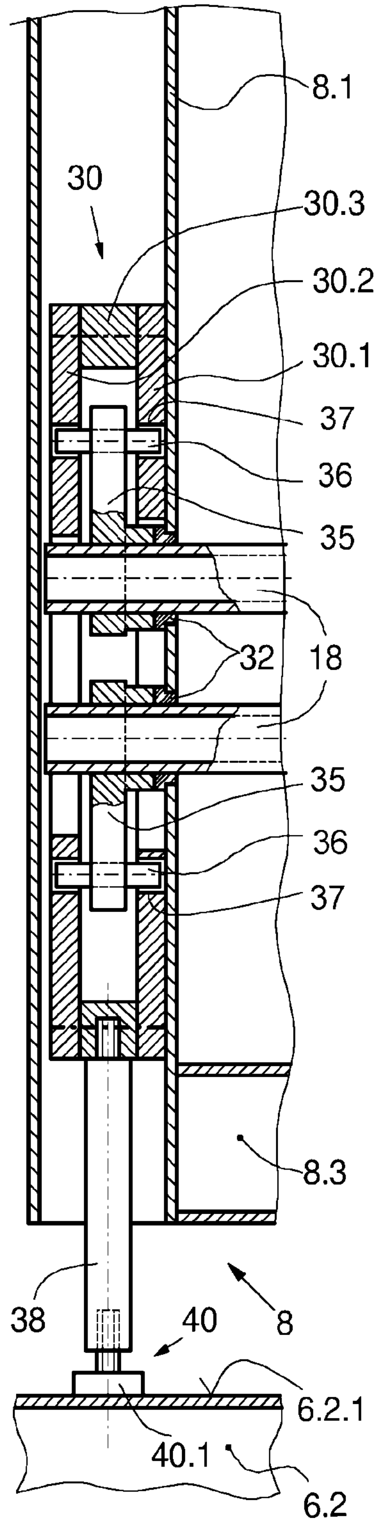
FIG. 3A is a vertical section in FIG. 2 both through the upper part of the horizontally displaceable door leaf support frame with the control element integrated in the upper frame part and through a vertical support of the door frame which is arranged to the left of the door leaf support frame and serves as a stationary stop.

FIG. 3A shows the region of the upper cross-member 8.1 of the door leaf support frame 8 in a front view. This shows a vertical section through the upper cross-member 8.1 and a vertical member 8.3 of the door leaf support frame 8, as well as through the door frame post 6.2 containing the door closing edge 6.2.1. The above-mentioned, cuboid control element 30 is fitted into the cavity of the upper cross-member 8.1 designed as a rectangular tube such that it can only be displaced along the longitudinal axis of the upper cross-member 8.1 relative to the door leaf support frame. The control element 30 comprises a lower and an upper control plate 30.1, 30.2, which are spaced apart from one another by spacer elements 30.3 rigidly connected to the control plates such that a cavity for installing parts of a transmission mechanism is present in the control element. The control element stop 38, which has already been mentioned, is fixed on the control element 30 on the side of the control element facing the door closing edge 6.2.1. This control element stop interacts with the door closing edge 6.2.1 serving as a stationary stop in such a way that, in one end region of the closing movement of the door leaf support frame 8, the control element 30 is displaced to the right relative to the upper cross-member 8.1 by the control element stop blocked by the door closing edge.

It can be seen in FIG. 3A that the upper ends of two of the vertically arranged torsion bars 18 mounted in the door leaf support frame 8 penetrate the control element 30, the upper bearing points 32 of the torsion bars being arranged in the lower wall of the upper cross-member 8.1 formed by a rectangular tube. Two drive levers 35 are installed in the region of the above-mentioned cavity in the control element, the first ends of which drive levers are each connected to an upper end of the two torsion bars 18 so that they cannot rotate. Slide bolts 36 arranged parallel to the torsion bars are fixed in the second ends of the drive levers 35. These slide bolts 36 protrude upward and downward from the drive levers 35, the portions of the slide bolts protruding from the drive levers projecting into control grooves 37 of the control element 30, which control grooves are present in both the lower and the upper control plate 30.1, 30.2 of the control element.

Figure 3B:
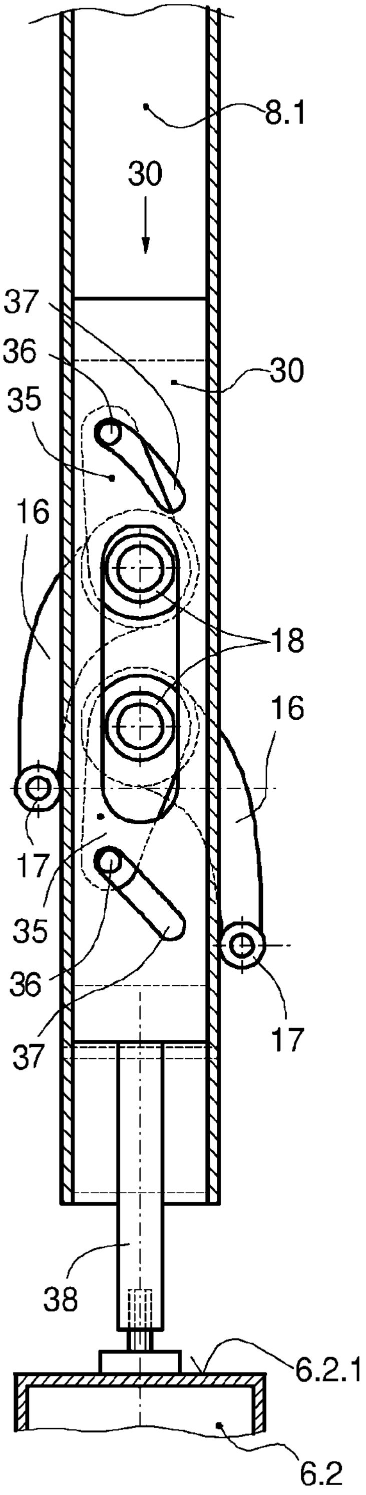
FIG. 3B is a horizontal section through the upper part of the door leaf support frame shown in FIG. 3A with a plan view of the control element with the drive levers arranged in the control element and the handlebar levers arranged below in the open state of the sliding door.
Figure 3C:
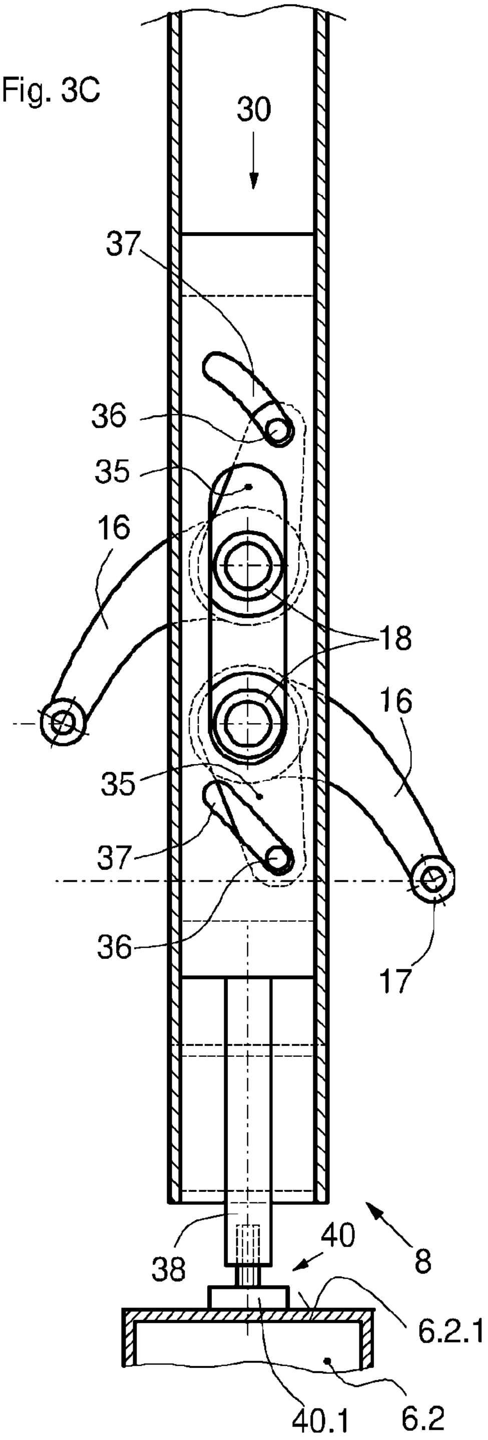
FIG. 3C is the horizontal section with the top view of the control element according to FIG. 3B, but in the closed state of the sliding door.

FIGS. 3B and 3C are horizontal sections through the upper cross-member 8.1 of the door leaf support frame with plan views of the control element 30 with the control element stop 38, which control element can be displaced in the cavity of the cross-member 8.1. The horizontal portions also extend through the door frame post 6.2 containing the door closing edge 6.2.1. The plan views show the two torsion bars 18, each of which supports an upper and a lower handlebar lever 16, the handlebar levers of one torsion bar being assigned to the first door leaf 15.1 (not shown here) and the handlebar levers of the second torsion bar being assigned to the second door leaf 15.2 (not shown here). Furthermore, the drive levers 35 arranged in the cavity of the control element 30 and connected to the upper ends of the torsion bars 18 are shown, predominantly with dashed lines. The two pairs of control grooves 37 in the lower and upper control plates, respectively, of the control element 30, into which grooves the slide bolts 36 arranged on each of the two drive levers 35 protrude, can also be seen. Neither the door leaves nor the second torsion bars assigned to one of the door leaves are shown in FIG. 3B or FIG. 3C.

FIG. 3B shows the situation at the beginning of the above-mentioned end region of the closing movement of the door leaf support frame 8, in which situation the distances between the door leaves guided on the handlebar levers 16 and the door leaf support frame 8 are still minimal and the control element stop 38 just hits the door closing edge 6.2.1, forming the stationary stop, of the door frame post 6.2.

FIG. 3C shows the situation at the end of the closing movement of the door leaf support frame 8, in which the control element 30 has been moved to the right (upwardly in the figure) by the control element stop 38 by a distance of preferably approximately 10 to 20 millimeters relative to the door leaf support frame 8 from its position in the open state of the sliding door. This relative movement between the control element 30 and the door leaf support frame 8 and thus between the control grooves 37 and the torsion bars 18 moving with the door leaf support frame 8 has the effect that the control grooves 37 have moved the slide bolts 36 and thus the drive levers 35, the torsion bars 18 and the handlebar levers 16 fixed thereto from the positions shown in FIG. 3B into the positions shown in FIG. 3C. In other words: A transmission mechanism, which comprises the control grooves 37 in the control element 30, the slide bolts 36 sliding in the control grooves, the drive levers 35, the torsion bars 18 and the handlebar levers 16 arranged on the torsion bars, converts the first relative movement, generated in the end region of a closing movement, between the control element 30 and the door leaf support frame 8 into a defined pivoting movement of the handlebar levers 16 and thus into an increase in the distances between the door leaf and the door leaf support frame 8. The profiles of the control grooves 37 are designed such that the door leaf bearing points 17 at the door-leaf-side ends of the handlebar levers 16 and thus the door leaves (not visible here) coupled thereto perform a movement directed at a right angle to the closing movement of the door leaf support frame 8 or to the outer surfaces of the wall elements (3.1, 3.2, FIG. 1B). Such a right-angled movement is created by superimposing the displacement of the torsion bars 18 moved with the door leaf support frame 8 in the end region of the closing movement with a pivoting movement of the door leaf bearing points 17 of the handlebar levers 16 around the moving torsion bars, where the perfect right-angled absolute movement of the door leaf bearing points 17 can be achieved by a suitable shape of the control grooves 37.

During an opening process of the sliding door, care must be taken in the initial region of the opening movement of the door leaf support frame 8 to reverse the first relative movement of the control element with respect to the door leaf support frame that occurred during the closing process. In the case of the sliding door shown in FIGS. 3A-3C, this is achieved in that a retaining device 40 is attached to the end of the control element stop facing the door frame post with the door closing edge, by means of which retaining device the control element is retained with limited predetermined holding force in an initial region of the opening movement. In the embodiment according to FIGS. 3A-3C, the retaining device 40 substantially consists of a permanent holding magnet 40.1 attached to the control element stop 38. The control element is retained until the above-described increase in the distances between the door leaves and the door leaf support frame is reversed through the resulting second relative movement, counter to the first relative movement, between the control element 30 and the door leaf support frame 8 and this relative movement is stopped, for example, by a path limitation of the control element. The limited holding force of the permanent holding magnet 40.1 is then overcome by the displacement force of the door drive in combination with the inertia of the door leaf support frame 8, after which the door leaf support frame with the door leaves 15.1, 15.2 (FIG. 1B, 2) having a minimum distance therefrom is moved back between the two wall elements 3.1, 3.2 (FIG. 1A) until the open state of the sliding door is reached.

FIG. 4A again shows the region of the upper cross-member 8.1 of the door leaf support frame 8 already shown in FIG. 3C in a front view. The control element 30 with the control grooves 37 and its control element stop 38, which control element is arranged displaceably in the cross-member, can be seen. Furthermore, the two torsion bars 18 assigned to one of the door leaves can be seen with the drive levers 35 attached thereto and driven by the control grooves 37 via the slide bolts 36, as well as with the handlebar levers 16 attached thereto and supporting the door leaves 15.1, 15.2.

Figure 4A:
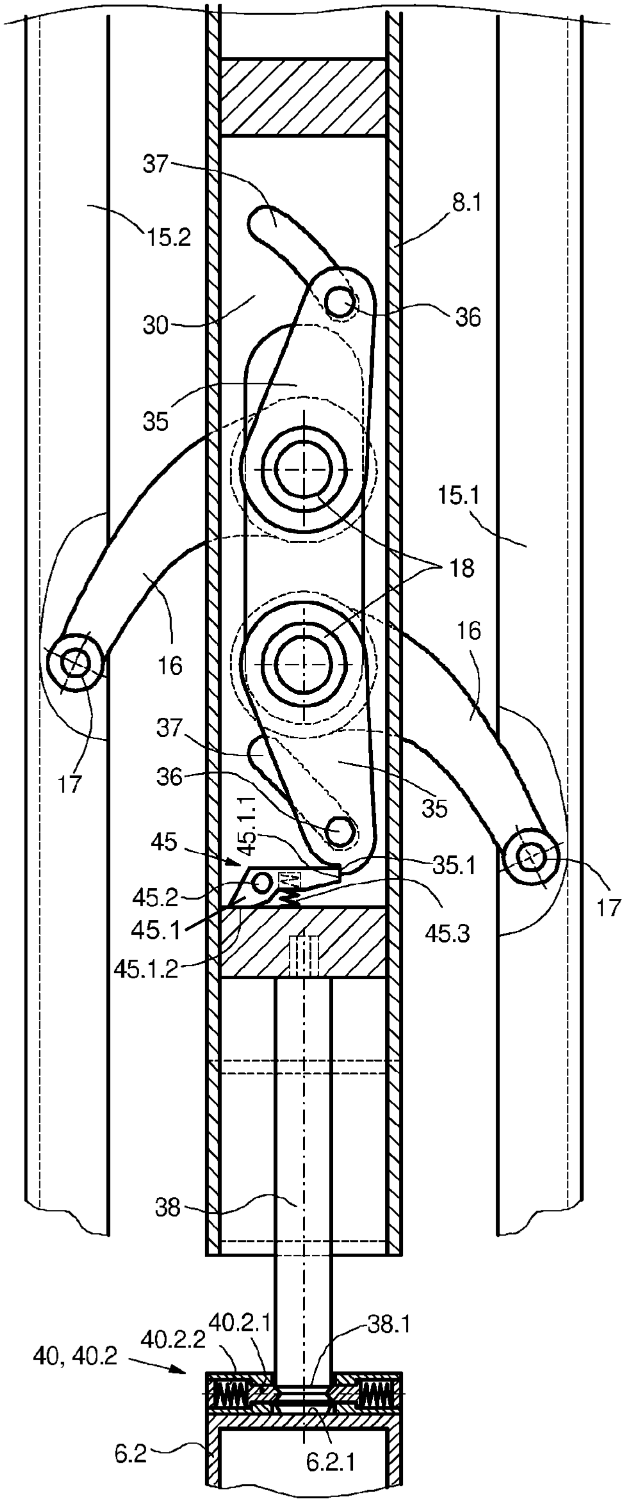
FIG. 4A is a horizontal section through the upper part of the door leaf support frame shown in FIG. 3A, through the control element integrated therein and through the door frame post arranged to the left of the door leaf support frame, with a latching pawl arranged in the control element and acting on a drive lever and with a retaining device for the control element fixed on the vertical support.

In the embodiment of the sliding door shown in FIG. 4A, the control element stop 38 and thus also the control element 30 are not retained by a permanent holding magnet during an opening movement of the door leaf support frame 8, but by a mechanically acting retaining device 40, in the form of a locking device 40.2 and fixed on the door closing edge 6.2.1 of the door frame post 6.2 forming the stationary stop, with a limited holding force until the first relative movement between the control element 30 and the door leaf support frame 8 during the closing process is reversed. The second relative movement occurring in this case is converted into a decrease in the distances between the door leaves and the door leaf support frame by the transmission mechanism described above. The locking device 40.2 can comprise one or more locking bolts 40.2.1 which, by means of compression springs 40.2.2 with adjustable contact force, latch into a suitably shaped annular groove 38.1 of the control element stop 38. In order that the locking bolts 40.2.1 generate as little resistance as possible in the axial direction when the control element stop 38 is retracted into the locking device 40.2, the locking bolts are pushed radially outward via a relatively flat bevel counter to the force of the compression springs 40.2.2.

In the embodiment shown in FIG. 4A, a door leaf 15.1 is also equipped with a latching device 45 arranged in the cavity of the control element 30, which latching device, in the case of this door leaf 15.1, prevents a decrease in the maximum distance in the closed state shown between the door leaf and the door leaf support frame 8 by pressure on its outer surface. Mechanical opening of the sliding door from the side of the door leaf 15.1 is not possible, since at least the locked door leaf cannot be moved between the wall elements 3.1, 3.2 (FIG. 1B). The latching device 45 comprises a latching pawl 45.1 which can be pivoted about a pivot bearing 45.2. The pawl nose 45.1.1 of the latching pawl is first pushed away counter to the force of a return spring 45.3 by a latching stop 35.1 present on the drive lever 35 when the drive lever 35 is pivoted into the position which corresponds to the maximum distance between the door leaf and the door leaf support frame, after which the pawl nose 45.1.1 latches behind the latching stop 35.1 of the drive lever with a stop depth limited by a latching pawl stop 45.1.2. This latching process takes place every time the sliding door is closed.

The latch can be unlocked in two different ways.

When the sliding door is opened normally, the door leaf support frame 8 is driven in the opening direction by the traction means drive 21 (FIG. 2). This produces the second relative movement explained above, in which the door leaf support frame 8 moves with respect to the control element 30, which is fixed with limited holding force, in such a way that the drive lever 35 coupled to the door leaf support frame with its latching stop 35.1 moves away from the latching pawl 45.1 arranged in the control element. After a very slight second relative movement—for example after 2 mm—the pawl nose 45.1.1, the possibility of movement of which in the direction on the drive lever 35 is limited by the latching pawl stop 45.1.2 of the latching pawl 45.1, comes out of engagement with the latching stop 35.1 present on the drive lever 35, so that the latch is released and the sliding door can be opened.

The latch can, however, also be unlocked by a person pressing their hand against the outer surface of the door leaf 15.2, the drive lever 16 of which does not have a latch. This may be necessary, for example, in the event of a power failure or another defect. Via the handlebar lever 16 assigned to this door leaf 15.2, which lever is arranged on the same torsion bar 18 on which the drive lever 35 assigned to this door leaf is located, the slide bolt fixed in the second end of the drive lever is moved into the associated control groove of the control element by pressing on the door leaf 15.2, such that the drive lever exerts a force directed in the opening direction of the sliding door on its torsion bar and thus on the door leaf support frame. This force causes a relative movement between the door leaf support frame, in which the drive lever 35 with the latching stop 35.1 is mounted, and the control element 30 on which the latching pawl 45.1 is arranged. A slight relative movement is sufficient to bring the latching pawl out of engagement with the latching stop 35.1 on the drive lever 35 so that the distances between the door leaves and the door leaf support frame are minimized and the sliding door can be opened.

Figure 4B:
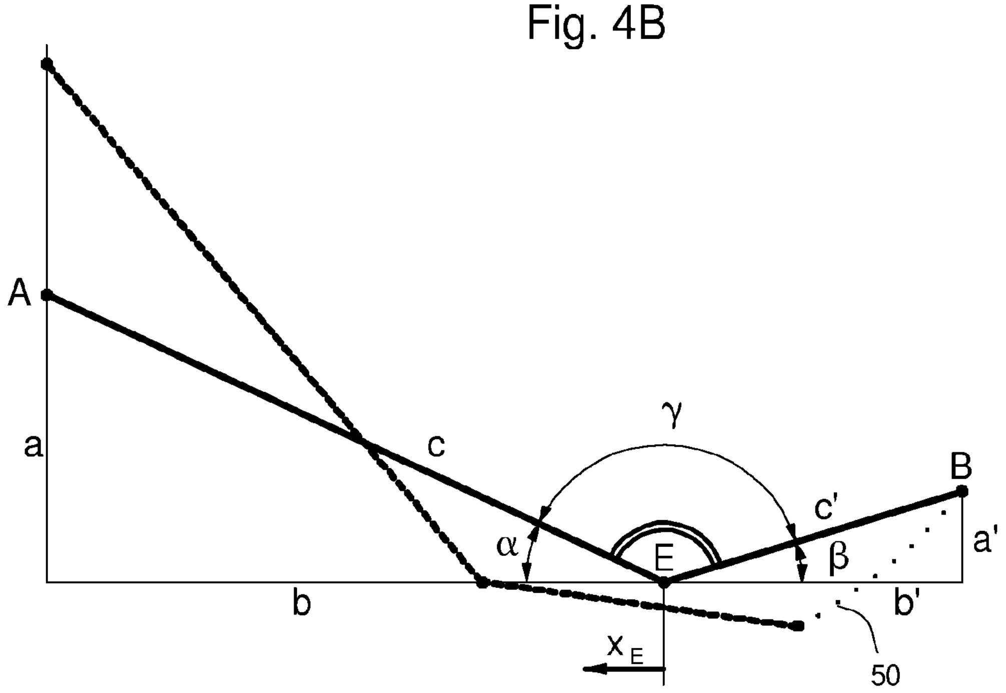
FIG. 4B is a diagram that illustrates the transmission mechanism that converts a relative movement between the door leaf support frame and the control element mounted displaceably therein into a movement of the at least one door leaf directed at a right angle to the displacement direction of the door leaf support frame.

FIG. 4B schematically shows the effective transmission mechanism during the closing process of the sliding door, which mechanism converts the first relative movement in the end region of the closing movement of the door leaf support frame between the control element and the door leaf support frame into movements, at a right angle to the closing movement of the door leaf support frame, of the door leaf bearing points 17 present on the handlebar levers 16.

The drawing shows the situation of the transmission mechanism arranged on the right-hand side in FIG. 4A, which mechanism substantially comprises the control element 30 with the control groove 37, the drive lever 35 with the slide bolt 36 fixed at its second end and engaging in the control groove 37, the torsion bar 18 driven by the drive lever 35 and mounted in the door leaf support frame 8, and the handlebar lever 16 fixed on the torsion bar.

In the diagram shown in FIG. 4B, the abscissa (b, b') corresponds to the path of the relative movement of the torsion bar mounted on the door leaf support frame with respect to the stationary control element. $x_E$ is the path of the torsion bar, denoted by E, on this abscissa. The ordinate a corresponds to the desired path, which runs at a right angle to the closing movement of the door leaf support frame or to the relative movement of the torsion bar, of the door leaf bearing point, denoted here by A, at the end of the handlebar lever. The ordinate a' corresponds to the desired path, which runs at an angle to the closing movement of the door leaf support frame or to the relative movement of the torsion bar, of the slide bolt, denoted here by B, at the end of the drive lever. The section c corresponds to the length of the handlebar lever, the section c' to the length of the drive lever, $\gamma$ is the fixed angle between the handlebar lever and the drive lever, $\alpha$ is the changing angle between the direction of the relative movement and the handlebar lever and $\beta$ is the angle, directly dependent on $\alpha$, between the relative movement and the drive lever.

In the following, formulas are derived that can be used to control the processing machine when producing the control grooves in the control element.

The coordinates of the curve points of the curve defining the control groove (37), which are dependent on the relative displacement $x_E$ between the door leaf support frame (8) and the control element (30), are denoted by $x_B$ and $y_B$. The formulas are:

$$\alpha = \arccos\frac{b}{c} = \arccos\frac{c*\cos\alpha_0 - x_E}{c} = \arccos\left(\cos\alpha_0 - \frac{x_E}{c}\right)$$

$$y_B = c' * \sin\beta = c' * \sin\left[\pi - \gamma - \arccos\left(\cos\alpha_0 - \frac{x_E}{c}\right)\right]$$

$$x_B = x_E - c' * \cos\beta$$

$$\beta = \pi - \gamma - \alpha = \pi - \gamma - \arccos\left(\cos\alpha_0 - \frac{x_E}{c}\right)$$

$$x_B = x_E - c' * \cos\beta = x_E - c'\left\{\cos\left[\pi - \gamma - \arccos\left(\cos\alpha_0 - \frac{x_E}{c}\right)\right] - \cos\beta_0\right\}$$

The results of the application of these formulas are plotted in FIG. 4B with a curve shown in dotted lines as the course of the control groove with the reference sign 50.

A sliding door according to the invention can also be designed with only a single door leaf if the aesthetics are not important in one of the rooms connected by the sliding door.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding door for installation between two parallel spaced apart wall elements of a building wall, a first of the wall elements having a door opening, a linear guide arranged above the door opening, the sliding door including a door leaf frame being horizontally displaceable on the linear guide in a displacement direction parallel to the wall elements when the sliding door is installed between the wall elements, the sliding door including at least one door leaf attached to the door leaf support frame by four handlebar levers forming a parallelogram guide system whereby a distance, measured at a right angle to the displacement direction, between the at least one door leaf and the door leaf support frame can be changed such that an outer surface of the at least one door leaf is positioned between the wall elements in an open state of the sliding door and the at least one door leaf is positioned in the door opening in a closed state of the sliding door with the outer surface of the at least one door leaf aligned with an outer surface of the first wall element, the sliding door comprising:

a control element arranged at the door leaf support frame and being displaceable in the displacement direction, the control element being blocked at a beginning of an end region of a closing movement of the door leaf support frame by a stationary stop and then displaced relative to the door leaf support frame during further movement of the door leaf support frame in the closing movement;

a transmission mechanism that converts a first relative movement occurring between the control element and the door leaf support frame during the closing movement into a pivoting movement of the handlebar levers forming the parallelogram guide system thereby increasing the distance between the at least one door leaf and the door leaf support frame;

two vertically arranged and horizontally spaced torsion bars, each of the torsion bars having a longitudinal axis and being mounted on the door leaf support frame for pivoting about the longitudinal axis, wherein each of the handlebar levers has one end fixed to an associated one of the torsion bars and has a vertical-axis door leaf bearing point at another end, the handlebar levers being a same length and aligned parallel to one another, and wherein the bearing points interact with corresponding bearing points on the at least one door leaf such that the at least one door leaf is guided on the parallelogram guide system whereby a pivoting movement of one of the two torsion bars causes an increase or decrease in the distance between the at least one door leaf and the door leaf support frame; and wherein the transmission mechanism has a control groove arranged in the control element, a drive lever attached to one of the two torsion bars and a slide bolt fixed to an end of the drive lever facing away from the one torsion bar, the slide bolt extending parallel to the one torsion bar and engaging in the control groove, the control groove being shaped such that the first relative movement occurs at the beginning of the end region of the closing movement wherein the slide bolt is moved in the control groove resulting in a pivoting movement of the one torsion bar and the handlebar levers forming the parallelogram guide system.

2. The sliding door according to claim 1 wherein the control groove arranged in the control element is shaped such that, in the end region of the closing movement, a movement of the at least one door leaf directed at a right angle to the displacement direction results from a superimposition of the movement of the torsion bars moving with the door leaf support frame and the handlebar levers pivoting around the torsion bars.

3. The sliding door according to claim 1 wherein the at least one door leaf includes a latching device that, when the sliding door is in the closed state, prevents a reset of the increase in the distance between the at least one door leaf and the door leaf support frame and thus prevents an opening movement of the door leaf support frame.

4. The sliding door according to claim 3 wherein the latching device includes a latching stop arranged on the one torsion bar and a latching pawl pivotably mounted at the control element and resiliently engaging in the latching stop, the latching pawl interacting with the latching stop such that, after each closing of the sliding door, a turning back of the one torsion bar and thus a reset of the increase in the distance between the at least one door leaf and the door leaf support frame and thus an opening of the sliding door is prevented until either a drive connected to the door leaf support frame initiates the opening movement or a manual application of force to the sliding door brings the latching pawl out of engagement with the latching stop.

5. The sliding door according to claim 4 including another door leaf attached to the door leaf support frame and wherein the manual application of force that brings the latching pawl out of engagement with the latching stop is generated by manually pressing against an outer surface of the another door leaf.

6. The sliding door according to claim 1 including a retaining device arranged between the control element and the stationary stop, wherein the retaining device, at an end of the closing movement of the door leaf support frame, holds the control element in a fixed position with a predetermined force such that in an initial region of an opening movement of the door leaf support frame the control element performs a second relative movement, counter to the first relative movement, between the control element and the door leaf support frame, whereby the transmission mechanism resets the distance between the at least one door leaf and the door leaf support frame.

7. The sliding door according to claim 6 wherein the retaining device includes a permanent holding magnet attached to the control element such that at the beginning of the end region of the closing movement the permanent holding magnet strikes the stationary stop being made of soft magnetic material whereby the control element performs the first relative movement and is held on the stationary stop with the predetermined holding force.

8. The sliding door according to claim 6 wherein the retaining device includes a spring-loaded locking device that interacts with a surface on the control element, the surface being inclined with respect to a direction of the opening movement, such that the control element strikes the stationary stop at a beginning of the end region of the closing movement and is retained by the locking device with the predetermined holding force at a beginning of the initial region of the opening movement.

9. The sliding door according to claim 1 including an electric motor arranged on the door leaf support frame and being operable to horizontally displace the door leaf support frame in the displacement direction.

10. The sliding door according to claim 1 including another door leaf attached to the door leaf support frame by four other handlebar levers forming another parallelogram guide system and being arranged symmetrically to the at least one door leaf, the at least one door leaf and the another door leaf being movable transversely to the displacement direction in opposite directions, wherein when the sliding door is installed between the wall elements an outer surface of the another door leaf is positioned between the wall elements in an open state of the sliding door and the another door leaf is positioned in a door opening of a second one of the door elements in a closed state of the sliding door with the outer surface of the another door leaf aligned with an outer surface of the second wall element.

11. The sliding door according to claim 1 wherein the door leaf support frame is guided in an uppermost region thereon on the linear guide arranged above the door opening such that the uppermost region can only move parallel to the linear guide, and the door leaf support frame is guided in a lowermost region thereof in a guide shoe arranged on the side of the door opening.

12. A sliding door for installation between two parallel spaced apart wall elements of a building wall, each of the wall elements having a door opening, the sliding door comprising:

a door leaf support frame guided on a linear guide arranged above the door openings when the door leaf support frame is installed between the wall elements, the door leaf frame being horizontally displaceable on the linear guide in a displacement direction parallel to the wall elements;

a first door leaf attached to one side of the door leaf support frame by four handlebar levers forming a parallelogram guide system and a second door leaf attached to an opposite side of the door leaf support frame by four handlebar levers forming another parallelogram guide system;

whereby the parallelogram guide systems operate to change a distance, measured at a right angle to the displacement direction, between the door leaf support frame and each of the first door leaf and the second door leaf such that an outer surface of each of first and second door leaves is positioned between the wall elements in an open state of the sliding door and each of the door leaves is positioned in an associated one of the door openings in a closed state of the sliding door with the outer surfaces of the first and second door leaves aligned with an outer surfaces of the wall elements;

a control element arranged at the door leaf support frame and being displaceable in the displacement direction, the control element being blocked at a beginning of an end region of a closing movement of the door leaf support frame by a stationary stop and then displaced relative to the door leaf support frame during further movement of the door leaf support frame in the closing movement;

a transmission mechanism that converts a first relative movement occurring between the control element and the door leaf support frame during the closing movement into a pivoting movement of the handlebar levers forming the parallelogram guide systems thereby increasing the distance between the door leaf support frame and the first and second door leaves; and two pairs of vertically arranged and horizontally spaced torsion bars, each of the torsion bars having a longitudinal axis and being mounted on the door leaf support frame for pivoting about the longitudinal axis, wherein each of the handlebar levers has one end fixed to an associated one of the torsion bars and has a vertical-axis door leaf bearing point at another end, the handlebar levers being a same length and aligned parallel to one another, and wherein the bearing points interact with corresponding bearing points on the first and second door leaves such that the first and second door leaves are guided on the parallelogram guide systems whereby a pivoting movement of one of the torsion bars or each of the pairs of torsion bars causes an increase or decrease in the distance between the door leaf support frame and the first and second door leaves; and wherein the transmission mechanism has a control groove arranged in the control element, a drive lever attached to one of the torsion bars and a slide bolt fixed to an end of the drive lever facing away from the one torsion bar, the slide bolt extending parallel to the one torsion bar and engaging in the control groove, the control groove being shaped such that the first relative movement occurs at the beginning of the end region of the closing movement wherein the slide bolt is moved in the control groove resulting in a pivoting movement of the one torsion bar and the handlebar levers forming the parallelogram guide system.

13. A sliding door for installation between two parallel spaced apart wall elements of a building wall, a first of the wall elements having a door opening, the building wall including a linear guide arranged above the door opening, the sliding door comprising:

a door leaf support frame that, when installed between the wall elements, is adapted to be guided on and be horizontally displaceable on the linear guide in a displacement direction parallel to the wall elements;

at least one door leaf attached to the door leaf support frame by four handlebar levers forming a parallelogram guide system whereby a distance, measured at a right angle to the displacement direction, between the at least one door leaf and the door leaf support frame can be changed such that an outer surface of the at least one door leaf is positioned between the wall elements in an open state of the sliding door and the at least one door leaf is positioned in the door opening in a closed state of the sliding door with the outer surface of the at least one door leaf aligned with an outer surface of the first wall element;

a control element arranged at the door leaf support frame and being displaceable in the displacement direction, the control element being blocked at a beginning of an end region of a closing movement of the door leaf support frame by a stationary stop and then displaced relative to the door leaf support frame during further movement of the door leaf support frame in the closing movement;

a transmission mechanism that converts a first relative movement occurring between the control element and the door leaf support frame during the closing movement into a pivoting movement of the handlebar levers forming the parallelogram guide system thereby increasing the distance between the at least one door leaf and the door leaf support frame;

two vertically arranged and horizontally spaced torsion bars, each of the torsion bars having a longitudinal axis and being mounted on the door leaf support frame for pivoting about the longitudinal axis, wherein each of the handlebar levers has one end fixed to an associated one of the torsion bars and has a vertical-axis door leaf bearing point at another end, the handlebar levers being a same length and aligned parallel to one another, and wherein the bearing points interact with corresponding bearing points on the at least one door leaf such that the at least one door leaf is guided on the parallelogram guide system whereby a pivoting movement of one of the two torsion bars causes an increase or decrease in the distance between the at least one door leaf and the door leaf support frame; and wherein the transmission mechanism has a control groove arranged in the control element, a drive lever attached to one of the two torsion bars and a slide bolt fixed to an end of the drive lever facing away from the one torsion bar, the slide bolt extending parallel to the one torsion bar and engaging in the control groove, the control groove being shaped such that the first relative movement occurs at the beginning of the end region of the closing movement wherein the slide bolt is moved in the control groove resulting in a pivoting movement of the one torsion bar and the handlebar levers forming the parallelogram guide system.

14. The sliding door according to claim 13 wherein the control groove arranged in the control element is shaped such that, in the end region of the closing movement, a movement of the at least one door leaf directed at a right angle to the displacement direction results from a superimposition of the movement of the torsion bars moving with the door leaf support frame and the handlebar levers pivoting around the torsion bars.

15. The sliding door according to claim 13 wherein the at least one door leaf includes a latching device that, when the sliding door is in the closed state, prevents a reset of the increase in the distance between the at least one door leaf and the door leaf support frame and thus prevents an opening movement of the door leaf support frame.

16. The sliding door according to claim 15 wherein the latching device includes a latching stop arranged on the one torsion bar and a latching pawl pivotably mounted at the control element and resiliently engaging in the latching stop, the latching pawl interacting with the latching stop such that, after each closing of the sliding door, a turning back of the one torsion bar and thus a reset of the increase in the distance between the at least one door leaf and the door leaf support frame and thus an opening of the sliding door is prevented until either a drive connected to the door leaf support frame initiates the opening movement or a manual application of force to the sliding door brings the latching pawl out of engagement with the latching stop.

17. The sliding door according to claim 16 including another door leaf attached to the door leaf support frame and wherein the manual application of force that brings the latching pawl out of engagement with the latching stop is generated by manually pressing against an outer surface of the another door leaf.

* * * * *